US006232261B1

(12) United States Patent
Little

(10) Patent No.: US 6,232,261 B1
(45) Date of Patent: May 15, 2001

(54) CATALYST ACTIVATORS

(75) Inventor: Ian Raymond Little, Thames Ditton (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/354,270

(22) Filed: Jul. 15, 1999

Related U.S. Application Data

(63) Continuation of application No. PCT/GB98/00125, filed on Jan. 15, 1998.

(30) Foreign Application Priority Data

Jan. 17, 1997 (GB) .................................................. 9700945

(51) Int. Cl.[7] .............................. B01J 31/14; B01J 31/16
(52) U.S. Cl. .................... 502/158; 502/104; 502/113; 502/117; 502/125; 502/152; 526/114; 526/116; 526/119; 526/160; 526/127; 526/358
(58) Field of Search .................... 502/104, 113, 502/125, 117, 152, 158; 526/114, 127, 116, 119, 348, 160

(56) References Cited

U.S. PATENT DOCUMENTS

| 4,945,076 | | 7/1990 | Piotrowski et al. . | |
| 5,034,549 | * | 7/1991 | Piotrowski et al. | 556/10 |
| 5,077,255 | * | 12/1991 | Welborn, Jr. | 502/104 |
| 5,329,032 | * | 7/1994 | Tran et al. | 556/179 |

FOREIGN PATENT DOCUMENTS

| 0 685 494 | 12/1995 | (EP) . |
| 0 726 271 | 8/1996 | (EP) . |

OTHER PUBLICATIONS

A. Kunicki et al., "Studies on the Reaction of Tetraethylalumoxane with Alcohols", Bull. Pol. Acad. Sci. Chem., pp. 263–273, (1985). (no month).

N.N. Korneev et al., "Reaction of Triisobutylaluminum and Isobutylalumoxanes with Hydroxy–Containing Organosilicon Compounds", Chemical Abstracts, XP–002060484, vol. 108:112535, (1988), (Abstract Only). (no month).

A.W. Apblett et al., "Synthesis and Characterization of Triethylsiloxy–Substituted Alumoxanes: Their Structural Relationship to the Minerals Boehmite and Diaspore", Chem. Mater., vol. 4, No. 1, pp. 167–182, (1992). (no month).

Yu. M. Rodionov et al., "Manufacture of Alkoxy Aluminoxanes", Chemical Abstracts, XP–002060485, vol. 113:60620, (1990), (Abstract Only). (no month).

* cited by examiner

*Primary Examiner*—David W. Wu
*Assistant Examiner*—Caixia Lu
(74) *Attorney, Agent, or Firm*—Finnegan, Henderson, Farabow, Garrett and Dunner, L.L.P.

(57) ABSTRACT

A catalyst system suitable for the polymerization of olefins comprising an olefin polymerization catalyst and an activator comprising the reaction product of (i) an aluminoxane or (ii) the reaction product of an alkylaluminum and water with a silicon-containing compound, for example diphenylsilane diol. Preferred catalysts are metallocene complexes. The activators provide an alternative to the traditional use of aluminoxanes alone.

14 Claims, No Drawings

CATALYST ACTIVATORS

This is a continuation of PCT GB98/00125, filed on Jan. 15, 1998.

BACKGROUND OF THE INVENTION

The present application relates to novel activators for catalysts in particular to novel activators for catalysts useful for the polymerization of olefins.

The use of activators or cocatalysts for olefin polymerization-catalysts is well known. For example aluminium alkyls have been used with Ziegler catalysts while aluminoxanes have been used widely with well-defined single site catalysts, for example metallocene catalysts.

The choice of activator for a commercial catalyst depends on many parameters, including performance, cost, safety and stability. There is therefore a need to widen the range of catalyst activators available for use with olefin polymerisation catalysts.

WO 93/13140 describes a catalyst system comprising a modified monocyclopentadienyl transition metal/aluminoxane catalyst system in which a modifier is used having a Lewis Base functionality for example an alkoxysilane. WO 94/20506 describes a method for carrying out a secondary hydrolysis on an aluminoxane to provide a new material having a specific viscosity.

We have now found a class of silicon containing compounds which may be used as activators for olefin polymerization catalysts in particular for use with metallocene catalysts.

SUMMARY OF THE INVENTION

Thus according to the present invention there is provided a catalyst system suitable for use in the polymerization of olefins comprising:
(A) an olefin polymerization catalyst, and
(B) the product of (i) an aluminoxane or (ii) the reaction product of an alkylaluminium compound and water, with a silicon-containing compound having the formula:

wherein
$R, R^1$=hydrocarbyl for example alkyl, aryl, alkenyl, or substituted hydrocarbyl
$x=1$ to 3, and
$y=0$ or 1.

DETAILED DESCRIPTION OF THE INVENTION

Suitable examples of the silicon-containing compound include trimethyl silanol, triethyl silanol, triphenylsilanol, dimethyl phenyl silanol, diphenyl methyl silanol, trimethyl silyl methanol, trimethyl silyl ethanol, trimethyl silyl propanol, dimethylphenylsilyl methanol, diphenylmethylsilyl methanol, dimethyl silane diol, diethyl silane diol and methyl ethyl silane diol.

Preferred activators are those where R is alkyl or aryl or subsituted alkyl or aryl, $x=2$ and $y=0$ For example compounds having the formula:

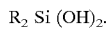

Aryl silane diols are most preferred for example diphenyl silane diol, phenylmethyl silane diol etc.

When present the preferred $R^1$ group is alkyl in particular ethyl.

Suitable olefin polymerization catalysts are metallocene complexes which may be represented by the general formula:

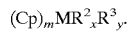

wherein Cp is a substituted or unsubstituted cyclopentadienyl nucleus; M is a Group IVA, VA or VIA transition metal in particular Zr, Ti, Hf; $R^2$ and $R^3$ are independently hydrocarbyl having 1–20 carbon atoms, halogen or other suitable monovalent ligand; $m=1–3$, $x=0–3$ and $y=0–3$ wherein the sum of m, x and y satisfy the oxidation state of M.

Particularly suitable are complexes in which the cyclopentadienyl nucleus is substituted by alkyl or alkenyl groups.

Examples of such metallocene catalysts may be found in the disclosures of EP 129368, U.S. Pat. No. 5,324,800 and EP 206794 incorporated herein by reference.

Also suitable for use as the metallocene are bridged complexes in which two cyclopentadienyl rings are linked via a suitable bridge.

Such complexes may be represented by the formula:

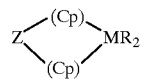

wherein Cp, M and R have the definitions given above the Z is a suitable bridging group eg alkylene, dialkylsilyl or dialkylgermanyl. In such complexes the cyclopentadienyl groups may be the same or different.

Particularly suitable are complexes having an alkylene bridge for example ethylene bis indenyl metal complexes such as ethylene (bis) indenyl zirconium dichloride.

The metallocene may also be represented by a monocyclopentadienyl heteroatom containing complex. Such complexes are disclosed for example in EP 416815 and EP 420436 both incorporated herein by reference.

The metallocene complex may also be represented by such monocyclopentadienyl complexes wherein the metal is in the +2 oxidation state. Such complexes are described in WO 95/00526 also incorporated herein by reference.

A further type of suitable metallocene complex are bis (cyclopentadienyl) diene complexes wherein the metal is in the +4 or +2 oxidation state. Such complexes are disclosed in WO 96/04290 also incorporated herein by reference.

Also suitable for use as the olefin polymerization catalyst of the present invention are traditional Ziegler Natta catalysts well known in the art. Typical catalysts of this type may be represented by transition metal/alkylaluminium systems for example catalysts based on magnesium, titanium and halogen.

Examples of suitable alkyl aluminium compounds are trialkylaluminium compounds ($R_3Al$) for example:
trimethyl aluminium,
triethylaluminium,
tri-n-propyl-, tri-isopropyl aluminium,
tri-n-butyl, tri-iso-butyl aluminium,
tri-n-pentyl, tri-iso-pentyl aluminium,
tri-n-hexyl, tri-iso-hexyl aluminium,
triheptylaluminium,
trioctylaluminium, etc Dialkylaluminium halides and alkyl aluminium dihalides may also be suitable, for example:

dimethyl aluminium chloride,
diethyl aluminium chloride,
dimethyl aluminium bromide,
methyl aluminium dichloride,
ethyl aluminium dichloride, etc.

The starting material in component (B) may be an aluminoxane or may be the reaction product of an alkyl aluminium compound described above with water. The water may be used as liquid, ice or water of crystallization eg aluminium sulphate hydrate.

The aluminoxane may suitably be methyl aluminoxane (MAO), ethyl aluminoxane or any other compound represented by the general formula $(R-Al-O)_x$.

The component (B) of the catalyst system when water is present may suitably comprise the following molar ratios of constituents-silicon: aluminium: water in the range 1:0.5–100:0.1–200 preferably in the range 1:5–20:5–20.

The component (B) of the catalyst system may be prepared by controlled hydrolysis of the alkyl aluminium compound with water in a suitable solvent followed by addition of the silicon-containing compound. Alternatively the silicon-containing compound may be added to the aluminoxane in a suitable solvent.

Suitable solvents include inert hydrocarbons such as toluene.

The above preparation of component (B) may suitably take place at −78° C. to 120° C., preferably at −50° C. to 40° C.

The catalyst system according to the present invention may also comprise a second catalyst component for example another metallocene complex or a Ziegler catalyst component.

The catalyst system may further comprise an inert support for example silica, alumina, silica-alumina, magnesia, magnesium chloride.

The support may undergo a pretreatment to modify its surface eg thermal or chemical dehydroxylation.

The catalyst system when supported may be prepared by any suitable means well known in the art. A preferred support is silica.

For example a mixture of the components (A) and (B) in a suitable solvent may be added to a silica or a silica supported Ziegler catalyst.

The catalyst system according to the present invention is suitable for use in the polymerization of olefins in particular in the homopolymerization of ethylene or the copolymerisation of ethylene with one or more alpha-olefins in particular those having from 3 to 10 carbon atoms. Most preferred alpha olefins are 1-butene, 1-hexene and 4-methyl-1-pentene.

The catalyst system is useful for the polymerization of olefins in the solution, slurry or gas phase. The catalyst system is however most suitable for use in the gas phase.

The polymerization process may preferably take place in the presence of a further cocatalyst or scavenger for example a trialkylaluminium compound.

According to another aspect of the present invention there is provided an activator for use with an olefin polymerization catalyst said activator comprising the product of (i) an aluminoxane or (ii) the reaction product of an alkylaluminium compound and water, with a silicon-containing compound having the formula:

wherein
R,R$^1$=hydrocarbyl
x=1 to 3, and
y=0 or 1.

The catalyst system according to the present invention will be further illustrated with reference to the following examples. The Examples illustrate the invention by exemplifing the use of a catalyst system comprising components A and B together with a supported Ziegler catalyst.

EXAMPLE 1

Preparation of Activator

To methylaluminoxane (supplied by Witco, 30.1 ml of 2.24 M toluene solution) at 0° C. under nitrogen atmosphere was added a slurry of diphenylsilanediol (supplied by Fluorochem, 1 g) in dry toluene (10 ml) dropwise over 15 minutes with stirring. The reacting mixture was maintained at 0° C. for a further 30 minutes, during which time methane was evolved, then warmed to 25° C. over 1 hour, leaving a slightly hazy colourless solution with no remaining evidence of solid diphenylsilanediol reagent.

2 ml of solution was taken and evacuated at 25° C. to remove the toluene and leave a white solid which was completely re-dissolved in d$^8$-toluene to afford a clear, transparent solution. This solution was subjected to analysis by $^{27}$Al, $^{29}$Si and $^{13}$C nmr. Results are shown in the following table, which also contains the same analysis of the MAO starting material.

| | Chemical shift | | |
|---|---|---|---|
| Example | 27 Al ppm | 29 Si ppm | 13 C ppm |
| MAO (Comparative) | 158 56 | no peaks | −7 −6.5 |
| (Example 1) | 63 | −29.7 −21.6 −21.5 −2.1 −0.4 2.7 | −7 −5 131 132 134 135.5 136.5 |

Major differences were recorded especially between the $^{27}$Al nmr spectra of the MAO and the activator of Example 1. The two features centred at 158 and 56 ppm for MAO were replaced by a single feature at 63 ppm for the activator according to the invention. This is evidence that the activator according to the invention is not aluminoxane, but a distinctly different material.

EXAMPLE 2

Preparation of Supported Ziegler Catalyst

Silica (Crosfield ES70, dried at 800° C. for 5 h in flowing nitrogen, 20 kg) was slurried in hexane (110 L, dry) and hexamethyldisilazane (Fluka, 30 mols, 0.8 mM/g of silica) added with stirring at 50° C. 120 L of hexane was added with stirring, the solid was allowed to settle, supernatant liquid removed by decantation and hexane (130 L, dry) added with stirring. This hexane washing was repeated a further 3 times. Dibutylmagnesium (FMC, 30 mols, 1.5 mM/g of silica) was added and stirred for 1 h at 50° C. t-Butyl chloride (Hüls, 60 mols, 3 mM/g of silica) was added and stirred for 1 h at 50° C. To this slurry was added an equimolar mixture of titanium tetrachloride (Thann & Mulhouse, 3 mols, 0.15 mM/g of silica) and titanium tetra-n-propoxide (Thann & Mulhouse, 3 mols, 0.15 mM/g of silica) with stirring at 50° C. for 2 hrs, followed by 5 washings with 130 L hexane. The slurry was dried under a flowing nitrogen stream to give a solid, silica-supported Ziegler catalyst.

EXAMPLE 3

Preparation of Supported Catalyst System

A solution from Example 1 (7.1 ml) was added to bis(propenylcyclopentadienyl) zirconium chloride (30.6 mg) under nitrogen. The resulting solution was added to the silica-supported Ziegler catalyst prepared in Example 2 (2.09 g) and the thick slurry left for 30 min. at 25° C. The solvent was removed under vacuum at 25° C. to give a light brown free-flowing powder.

EXAMPLE 4

Polymerisation

A 3 liter reactor equipped with helical stirrer was heated to 80° C. for 1 h under flowing nitrogen. Dry sodium chloride (300 g) was then added with trimethylaluminium (TMA) solution (2 ml of 2 M TMA in hexanes) and the reactor heated to 80° C. for 1 h. The reactor was purged with nitrogen, cooled to 45° C. and TMA solution (1.8 ml of 0.5 M TMA in hexanes) added. The temperature was raised to 75° C. and hydrogen (40 mbar) and 1-hexene (1.2 ml) added prior to addition of ethylene (7.9 bar). Reaction was started by injection of the catalyst of Example 3 (0.16 g) into the reactor. The temperature was maintained at 75° C. and ethylene added to maintain constant pressure. The gas phase was monitored by mass spectrometer and hydrogen and 1-hexene were added as necessary to maintain constant gas phase concentrations. After the designated polymerization time (60 minutes) the reaction was quenched by rapid reduction of the reactor to atmospheric pressure purging with nitrogen and cooling to room temperature.

The amount of polyethylene recovered was 28.6 g. GPC analysis showed it possessed a bimodal molecular weight distribution.

What is claimed is:

1. A catalyst system for the polymerization of olefins comprising
   (A) a catalyst for polymerizing an olefin; and
   (B) the reaction product of (i) an aluminoxane or (ii) the reaction product of an alkylaluminum compound and water, with a silicon-containing compound having the formula:

$$R_{(4-x)}SiR^1_y(OH)_x$$

wherein

R,$R^1$=hydrocarbyl x=1 to 3, and y=0 or 1.

2. The catalyst system of claim 1, wherein in the silicon-containing compound R is alkyl or aryl, x=2 and y=0.

3. The catalyst system of claim 1, wherein the silicon-containing compound is diphenylsilane diol.

4. The catalyst system of claim 1, wherein the catalyst for polymerizing an olefin is a metallocene complex.

5. The catalyst system of claim 4, wherein the metallocene complex has the general formula:

$$(Cp)_m MR^2_x R^3_y$$

wherein Cp is substituted or unsubstituted cyclopentadienyl nucleus; M is a Group IVA, VA or VIA transition metal, $R^2$ and $R^3$ are independently hydrocarbyl having 1–20 carbon atoms, halogen or other monovalent ligand; and m=1–3, x=0–3 and y=0–3, wherein the sum of m, x and y equals the oxidation state of M.

6. The catalyst system of claim 5, wherein M is selected from the group consisting of Zr, Ti and Hf.

7. The catalyst system of claim 1, wherein the alkylaluminum compound is a trialkylaluminum compound.

8. The catalyst system of claim 1, wherein the aluminoxane is methyl aluminoxane.

9. The catalyst system of claim 1, further comprising an inert support.

10. The catalyst system of claim 9, wherein the inert support is silica.

11. The catalyst system of claim 1, further comprising a second catalyst component.

12. The catalyst system of claim 11, wherein the second catalyst component is a Ziegler catalyst.

13. A process for the polymerization of ethylene or the copolymerization of ethylene and one or more alpha olefins having from 3 to 10 carbon atoms, comprising polymerizing ethylene or copolymerizing ethylene and one or more alpha olefins having from 3 to 10 carbon atoms in the presence of the catalyst system of claim 1.

14. The process of claim 13, wherein the polymerization is carried out in a gas phase.

* * * * *